(12) United States Patent
Vorndran et al.

(10) Patent No.: US 6,997,834 B2
(45) Date of Patent: Feb. 14, 2006

(54) DEVICE FOR GUIDING A MOVEABLE CONICAL PULLEY DISC OF A CVT VARIATOR

(75) Inventors: Ralf Vorndran, Eriskirch (DE); Thomas Fichtinger, Meckenbeuren (DE); Andreas Salm, Bodolz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 31 days.

(21) Appl. No.: 10/189,316

(22) Filed: Jul. 2, 2002

(65) Prior Publication Data

US 2003/0013566 A1   Jan. 16, 2003

(30) Foreign Application Priority Data

Jul. 6, 2001 (DE) .................................. 101 32 976

(51) Int. Cl.
*F16H 55/56*  (2006.01)
*F16H 63/00*  (2006.01)

(52) U.S. Cl. .......................... 474/28; 474/18; 474/42; 474/8

(58) Field of Classification Search .................. 474/8, 474/18, 28, 43
See application file for complete search history.

(56) References Cited

U.S. PATENT DOCUMENTS

| | | | | |
|---|---|---|---|---|
| 2,834,220 A | * | 5/1958 | Kingdom | 474/43 |
| 3,147,348 A | * | 9/1964 | Leeds et al. | 200/48 R |
| 3,358,520 A | * | 12/1967 | Kurt et al. | 474/43 |
| 3,436,106 A | * | 4/1969 | Luenberger | 403/356 |
| 4,075,902 A | * | 2/1978 | Charchian et al. | 474/44 |
| 4,487,595 A | * | 12/1984 | Quick et al. | 474/15 |
| 4,919,643 A | | 4/1990 | Fuss et al. | 474/46 |
| 5,603,670 A | | 2/1997 | Mozer | 474/43 |
| 6,012,998 A | * | 1/2000 | Schutz et al. | 474/43 |

FOREIGN PATENT DOCUMENTS

| | | | |
|---|---|---|---|
| DE | (406050) | * | 11/1924 |
| DE | 38 16 357 C1 | | 5/1989 |
| DE | 195 44 644 A1 | | 6/1996 |
| EP | 0 683 876 B1 | | 4/1997 |
| EP | 0 957 295 A2 | | 11/1999 |
| IT | (347360 A1 | * | 4/1936 |

* cited by examiner

*Primary Examiner*—Marcus Charles
(74) *Attorney, Agent, or Firm*—Davis & Bujold, P.L.L.C.

(57) ABSTRACT

A device, in a continuously variable belt transmission system, for guiding a conical pulley (3) of a variator on a variator shaft (1). The moveable conical pulley (3) is fitted onto two bearing sections (4, 5) of the variation shaft (1). At least one cylindrical pin (6), which is fitted into an axial guide grove (7) in the variator shaft (1) and an axial guide groove (8) of the movable conical pulley (3), is provided to transfer torque between the movable conical pulley (3) and the variator shaft (1).

15 Claims, 3 Drawing Sheets

DEVICE FOR GUIDING A MOVEABLE CONICAL PULLEY DISC OF A CVT VARIATOR

FIELD OF THE INVENTION

The invention concerns a device in a continuously variable belt transmission system for guiding a conical pulley disc of a variator, which can move in the axial direction on a variator shaft having a fixed conical pulley disc.

BACKGROUND OF THE INVENTION

To adjust the transmission ratio, continuously variable transmissions (CVTs) comprise a variator, usually with a pair of conical pulley discs respectively on the drive input and drive output shafts of the variator. Between this pair of conical pulley discs runs a belt, chain or jointed band looped around the drive input and output shafts. Each pair of conical pulley discs consists of a first conical pulley disc firmly attached to a shaft and a second conical pulley disc that can move in the axial direction. A mechanical or hydraulic actuation device is used to vary the axial position of the second, movable disc and hence also the effective diameter of the belt means for the continuous adjustment of the variator's transmission ratio.

From DE 38 16 357 C1 a continuously variable conical pulley and belt transmission system is known, in which a movable conical pulley disc of a variator represented therein is mounted on loose ball-bearings. These ball-bearings are guided in bearing races which are fitted, in the axial direction, on a variator shaft and the shank of the movable conical pulley disc. The variator shaft and the conical pulley shank have several such ball races. Two securing elements form the left and right abutments for the ball-bearings, which can move freely in the axial direction between the said abutments. During assembly of the pair of conical pulley discs, the security elements and the ball-bearings have to be fitted on individually by means of a device or by hand, which is troublesome and time-consuming.

To simplify the assembly of such a bearing for the movable conical pulley disc of a variator, EP 0 683 876 B1 proposes embedding the ball-bearings associated with one ball race in a holder element. The holder elements are designed such that the guiding function of the centering diameter between the movable conical pulley and the variator shaft is not compromised. The holder elements are at most connected to one another in a narrow area by means of a connector element. This makes it possible to fit all the ball-bearings in only one working step. Such holder elements and connector elements are usually made of sheet or plastic. To identify ball-bearings of the same tolerance the holder elements can be color coded.

From EP 0 957 295 A2 a belt-type variator is known, in which two bearing rings, by means of which the conical pulley of the variator that moves in the axial direction is mounted, are pressed onto the variator shaft that has the fixed conical pulley. When the transmission ratio is adjusted, the moving conical pulley slides axially on those bearing rings which therefore assume the function of a slide bearing. No additional element is provided for reinforcing the torque transfer of the moving conical pulley to the variator shaft. Because of this, the moving conical pulley can only transfer torque by friction force to the variator shaft, in other words by friction locking as a result of tilting of the moving conical pulley on the bearing rings. The torque transfer from the belt means to the variator shaft, therefore, takes place mainly via the fixed conical pulley disc.

Finally, from DE 195 44 644 A1 a variator for a continuously variable transmission is known in which a conical pulley, that can move in the axial direction, is mounted via two cylindrical sections of different diameter on a variator shaft having a fixed conical pulley, with no additional bearing elements. To reinforce the torque transfer of the movable conical pulley to the variator shaft, a splined shaft profile is provided between the conical pulley and the shaft which, for the purpose of torque transfer, must always have a minimum overlap and must have a certain clearance between the teeth to enable axial adjustability. To avoid wear, the splined shaft profile must be well supplied with lubricating oil at all times.

The purpose of the present invention is to provide a device in a continuously variable transmission system for guiding an axially movable conical pulley disc of a variator, on a variator shaft having a fixed conical pulley, the said device being inexpensive to manufacture and simple to assemble, and ensuring reliable torque transmission between the axially movable conical pulley disc and the variator shaft.

This objective is achieved by a device having the characteristics of the principal claim. Other advantageous features of the invention are defined in the subordinate claims.

SUMMARY OF THE INVENTION

Starting from the prior art described, the variator of the belt transmission comprises two pairs of conical pulleys for the continuous adjustment of the transmission ratio, each pair consisting of a fixed conical pulley and a conical pulley that can move in the axial direction. The fixed conical pulley of one pulley pair is positioned on a variator shaft to which it is solidly attached. Needless to say, the variator shaft and the fixed conical pulley can also be made as one piece. The associated movable conical pulley of the said pulley pair is mounted and can move axially on the corresponding variator shaft.

According to the invention, the mounting between the movable conical pulley disc and the variator shaft comprises at least one cylindrical pin to prevent rotation between the said movable conical pulley and the said variator shaft. For this, the variator shaft and the moving pulley have correspondingly shaped grooves in which the cylindrical pin is positioned during assembly.

On the one hand, the at least one cylindrical pin transmits the circumferential forces imposed on the movable conical pulley by a belt means to the variator shaft. On the other hand, the at least one cylindrical pin ensures that the movable conical pulley can be displaced along the variator shaft, for which purpose a small clearance is provided in the circumferential direction between the movable conical pulley disc and the variator shaft.

In an advantageous embodiment of the invention, two or three cylindrical pins are provided to prevent relative rotation between the variator shaft and the movable conical pulley.

Advantageously, the contact length of the cylindrical pin during torque transfer is very large compared with a ball-bearing. Correspondingly, the contact forces or surface pressures in the grooves and on the cylindrical pin are low. Thus, over the full life of the transmission only very little play is produced because of wear. As a result of the favorable contact forces or surfaces pressures in the grooves and on the cylindrical pin, the diameter of the cylindrical pin can be made relatively small and, at any rate, smaller than the ball diameter of a comparable ball-bearing. The structural space so gained can be used, for example, to increase the diameter of the variator shaft and hence its rigidity, which in turn leads to an improvement of the variator's efficiency.

Thanks to a special contour at one end of the cylindrical pin, its rotation relative to the variator shaft, during operation, can be at least largely avoided. It is appropriate for the length of the cylindrical pin to be chosen such that only a small relative movement between the cylindrical pin and the variator shaft is possible.

BRIEF DESCRIPTION OF THE DRAWING

The invention will now be described, by way of example, with reference to the accompanying drawings in which.

DETAILED DESCRIPTION OF THE INVENTION

Figure 1:
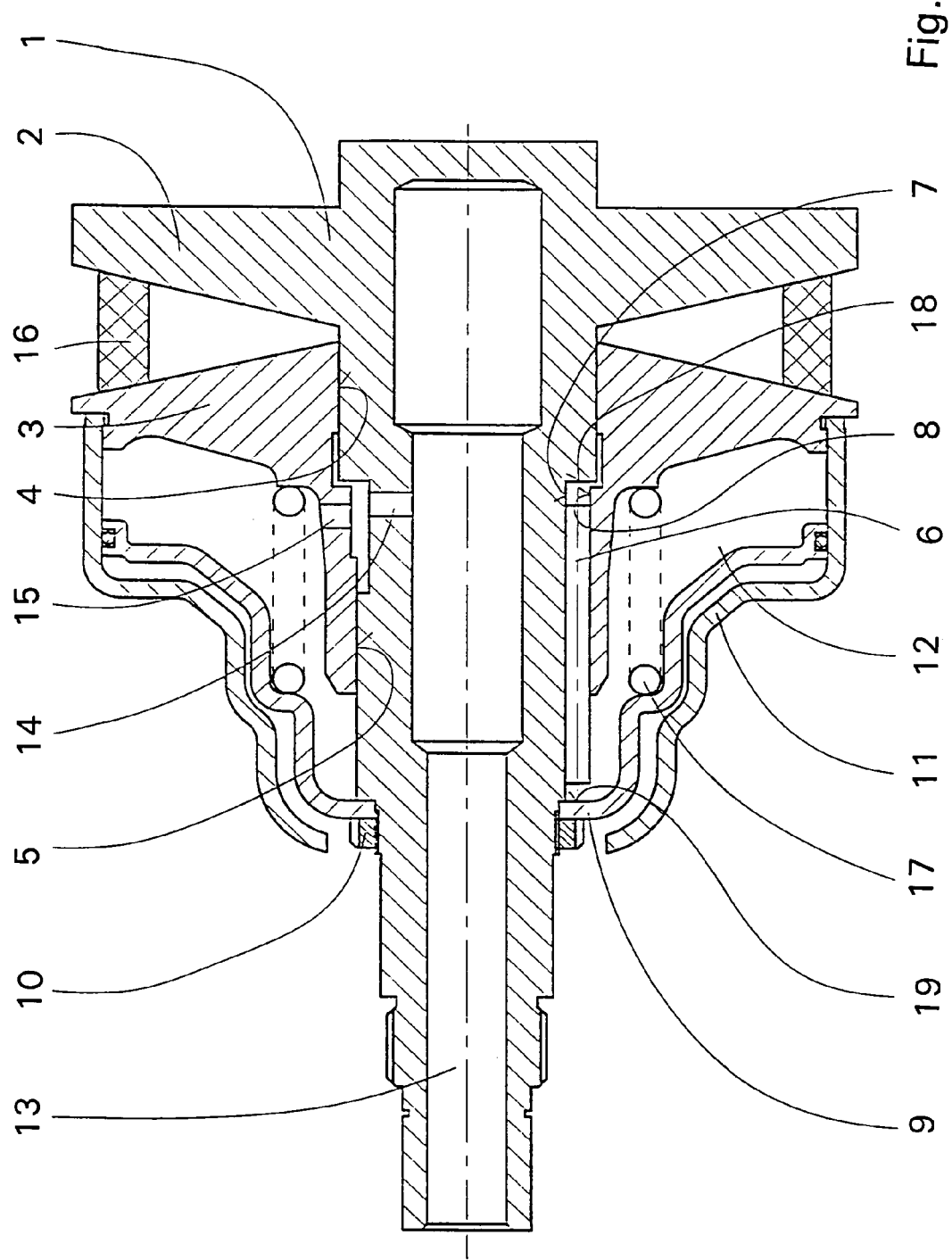
FIG. 1 is a longitudinal cross section of a variator shaft with a pair of conical pulley discs.

In the figure, the reference 1 denotes a variator shaft of a continuously variable belt transmission system, which is made as one piece with a conical pulley 2. A second, axially movable conical pulley 3, of the pair of conical pulleys, is fitted on a first bearing section 4 and a second bearing section 5 and can move axially along the variator shaft 1. In a different embodiment, the variator shaft 1 and the axially fixed conical pulley 2 can, of course, be made as separate components which are solidly attached to one another.

According to the invention, a cylindrical pin 6 is provided to prevent rotation of the movable conical pulley 3 relative to the variator shaft 1, the said pin being located in an axial guide groove 7 of the variator shaft 1 and in an axial guide groove 8 of the movable conical pulley 3.

On the variator shaft 1, a piston 9 is arranged which is axially fixed by means of a shaft nut 10. The piston 9, together with a cylinder 11 connected solidly to the movable conical pulley 3, forms a pressure chamber 12. This pressure chamber 12 can be pressurized via a pressure supply line 13 arranged axially in the variator shaft 1, a radial bore 14 in the shaft 1 and a radial bore 15 in the movable conical pulley 3 to press, on one hand, a belt means 16 between the pair of conical pulleys so as to transmit torque between the conical pulleys 2, 3 and the belt 16 and, on the other hand, to displace the movable conical pulley 3 axially relative to the conical pulley 2 fixed solidly to the variator shaft 1 and thus to adjust the transmission ratio of the variator. In addition, in this example embodiment, a restoring spring 17 is arranged in the pressure chamber 12 which maintains a particular transmission ratio for the variator in an unpressurized condition.

On one hand, the cylindrical pin 6 transfers the circumferential forces imposed on the movable conical pulley 3 by the belt means 16, for example, a V-belt, a chain on a jointed thrust band to the variator shaft 1. On the other hand, the cylindrical pin 6 ensures that the movable conical pulley 3 can move along the variator shaft 1, for which purpose a small clearance is provided in the circumferential direction between the movable conical pulley 3 and the variator shaft 1, and thus a clearance between the cylindrical pin 6 and the guide grooves 7 and 8, and a clearance at the two bearing sections 4 and 5.

Figure 2:
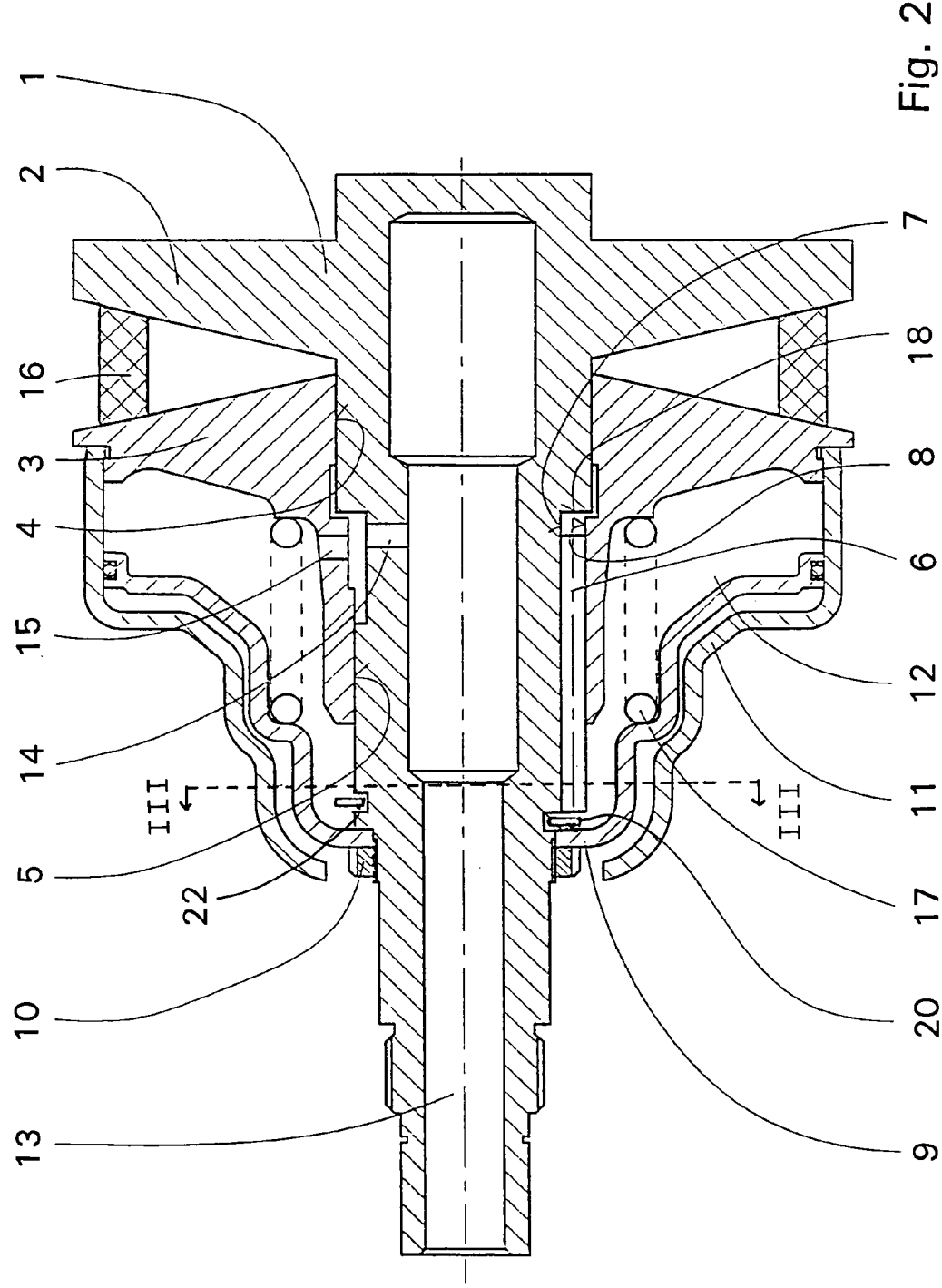
FIG. 2 is a longitudinal cross section of another embodiment of a variator shaft with a pair of conical pulley discs.

No additional axial securing element is necessary for the cylindrical pin 6, since the variator shaft has a correspondingly formed abutment 18 and the piston 9 a correspondingly formed abutment 19. In a different embodiment of the invention, however, at least one additional securing element can be provided to restrict the axial movement of the cylindrical pin 6. For example, FIG. 2 shows the axial movement of the cylindrical pin 6, in the guide groove 7 of the variator shaft 1, can be restricted by a ring 20 that fits into a specially formed radial groove 22 in the variator shaft. And the axial movement of the cylindrical pin 6 in the guide groove 8 of the movable conical pulley 3, for example, can be restricted by a ring that fits into a radial groove specially formed in the movable conical pulley 3.

Figure 3:
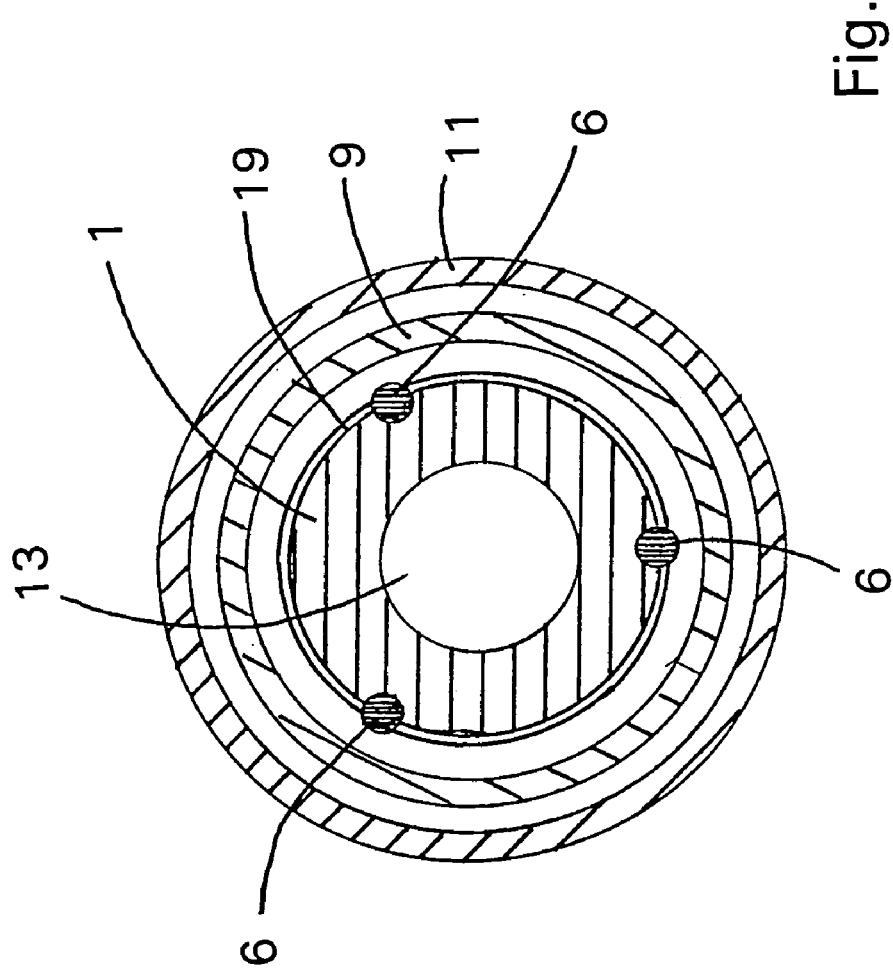
FIG. 3 is a sectional view taken on the line III—III of the variator shaft of FIG. 2.

In an advantageous embodiment of the invention, as seen in FIG. 3, two or three cylindrical pins 6 are provided to prevent rotation between the variator shaft 1 and the movable conical pulley 3.

In another embodiment of the invention, it can be provided that at least one end of the cylindrical pin or pins 6 has a particular contour by virtue of which rotation of the cylindrical pin 6, relative to the variator shaft 1 during operation, is at least largely avoided. Such an end contour can be, for example, a partial flattening of the cylindrical pin 6. Appropriately, the length of the cylindrical pin 6 is then chosen such that only a small axial relative movement of the cylindrical pin in the groove 7 of the variator shaft 1 is possible.

| | Index numbers |
|---|---|
| 1 | variator shaft |
| 2 | conical pulley disc attached on the variator shaft |
| 3 | axially movable conical pulley disc |
| 4 | first bearing section |
| 5 | second bearing section |
| 6 | cylindrical pin |
| 7 | guide groove in the variator shaft |
| 8 | guide groove in the movable conical pulley |
| 9 | piston |
| 10 | shaft nut |
| 11 | cylinder |
| 12 | variator pressure chamber |
| 13 | pressure supply line |
| 14 | radial bore in the variator shaft |
| 15 | radial bore in the movable conical pulley |
| 16 | belt means |
| 17 | restoring spring |
| 18 | abutment of the variator shaft |
| 19 | abutment of the variator piston |

The invention claimed is:

1. A device for guiding a movable conical pulley disc (3) relative to a fixed conical pulley disc (2) along a variator shaft (1) of a continuously variable belt transmission, the movable conical pulley disc (3) being supported by the variator shaft (1) and being axially movable along the variator shaft (1) via first and second bearing surfaces (4, 5) of the variator shaft (1), and at least one independent transfer element is provided between the movable conical pulley disc (3) and the variator shaft (1) to facilitate transfer of torque therebetween;

wherein the variator shaft (1) has at least one axial guide groove (7) and the movable conical pulley (3) has at least one corresponding axial guide groove (8) and a single independent transfer element is located within each corresponding pair of guide grooves (7, 8) for coupling the movable conical pulley (3) to the variator shaft (1), the single independent transfer element is an elongate cylindrical pin (6) having a length extending over a range of motion of the movable conical pulley (3), and the movable conical pulley (3) is independently axially movable with respect to both the variator shaft (1) and each elongate cylindrical pin (6);

first and second abutments (18, 19) restrict axial movement of the at least one independent cylindrical pin (6) along the guide groove (7) of the variator shaft (1); and the first abutment (18) is formed by a step in the variator shaft (1) and the second abutment (19) is formed by an element separate from the variator shaft (1).

2. The device according to claim 1, wherein the at least one independent cylindrical pin (6) and the guide groove (7) of the variator shaft (1) are formed so that rotation of the at least one independent cylindrical pin (6), relative to the variator shaft (1), is minimized.

3. The device according to claim 2, wherein the at least one independent cylindrical pin (6) is flattened to minimize rotation thereof relative to the variator shaft (1) during operation of the continuously variable belt transmission.

4. The device according to claim 1, wherein the second abutment (19) is formed by a surface of a piston (9) supported by the variator shaft (1).

5. The device according to claim 1, wherein the second abutment (19) is formed by a ring which fits in a radial groove of the variator shaft (1).

6. The device according to claim 1, wherein securing elements restrict axial movement of the at least one independent cylindrical pin (6) in the guide groove (8) of the movable conical pulley (3), and the securing elements are rings which fit into corresponding radial grooves of the movable pulley (3).

7. The device according to claim 1, wherein two independent cylindrical pins (6), which fit into corresponding guide grooves (7, 8) of the variator shaft (1) and the movable conical pulley (3), are respectively provided for transferring torque between the movable conical pulley (3) and the variator shaft (1).

8. The device according to claim 1, wherein three independent cylindrical pins (6), which fit into corresponding guide grooves (7, 8) of the variator shaft (1) and the movable conical pulley (3), are respectively provided for transferring torque between the movable conical pulley (3) and the variator shaft (1).

9. A device for a continuously variable transmission for guiding an axially movable conical pulley disc (3) along a variator shaft (1) relative to a fixed conical pulley disc (2), comprising:

the movable conical pulley disc (3), the variator shaft (1), and at least one independent transfer element having a length extending over a range of motion of the movable conical pulley (3) and located between the movable conical pulley disc (3) and the variator shaft (1) to facilitate transfer of torque therebetween; wherein the variator shaft (1) has at least one axial shaft guide groove (7) and the movable conical pulley (3) has at least one corresponding axial pulley guide groove (8), each transfer element is located within a corresponding pair of guide grooves (7, 8) for coupling the movable conical pulley (3) to the variator shaft (1), and for each transfer element, a first end the transfer element is located adjacent a first abutment (18) formed by a step in the variator shaft (1) at a first end of the corresponding axial guide groove (7), a second and opposite end of the corresponding pair of guide grooves (7,8) are open to receive the corresponding transfer element during assembly of the device, and the second end of the corresponding pair of guide grooves are closeable by a second abutment (19) formed in an element separate from the variator shaft (1) to restrict axial sliding movement of the transfer element along the guide grooves (7, 8) as the movable conical pulley (3) slides axially along the variator shaft (1).

10. The device according to claim 9, wherein the at least one independent transfer element is cylindrical pin (6) and the at least one independent cylindrical pin (6) and the guide groove (7) of the variator shaft (1) are formed so that rotation of the at least one independent cylindrical pin (6), relative to the variator shaft (1), is minimized.

11. The device according to claim 10, wherein the at least one independent cylindrical pin (6) is flattened to minimize rotation thereof relative to the variator shaft (1) during operation of the continuously variable belt transmission.

12. The device according to claim 9, wherein securing elements restrict axial movement of the at least one independent transfer element, which comprises at least one independent cylindrical pin (6) in the guide groove (8) of the movable conical pulley (3), and the securing elements are rings which fit into corresponding radial grooves of the movable pulley (3).

13. The device according to claim 9, wherein the at least one independent transfer element, which comprises two independent cylindrical pins (6), which fit into corresponding guide grooves (7, 8) of the variator shaft (1) and the movable conical pulley (3), are respectively provided for transferring torque between the movable conical pulley (3) and the variator shaft (1).

14. The device according to claim 9, wherein the at least one independent transfer element comprises three independent cylindrical pins (6), which fit into corresponding guide grooves (7, 8) of the variator shaft (1) and the movable conical pulley (3), are respectively provided for transferring torque between the movable conical pulley (3) and the variator shaft (1).

15. A device for guiding a movable conical pulley disc (3) relative to a fixed conical pulley disc (2) along a variator shaft (1) of a continuously variable belt transmission, the movable conical pulley disc (3) being supported by the variator shaft (1) and being axially movable along the variator shaft (1) via first and second bearing surfaces (4, 5) of the variator shaft (1), and at least one independent transfer element is provided between the movable conical pulley disc (3) and the variator shaft (1) to facilitate transfer of torque therebetween;

wherein the variator shaft (1) has at least one axial guide groove (7) and the movable conical pulley (3) has at least one corresponding axial guide groove (8) and a single transfer element is located within each corresponding pair of guide grooves (7, 8) for coupling the movable conical pulley (3) to the variator shaft (1), the single transfer element is an elongate independent cylindrical pin (6) having a length extending over a range of motion of the movable conical pulley (3), and the movable conical pulley (3) is independently axially movable with respect to both the variator shaft (1) and each elongate independent cylindrical pin (6), one end of each elongate independent cylindrical pin (6) is located for abutment with a first abutment (18), formed by a step in the variator shaft (1), while an opposite end of each elongate independent cylindrical pin (6) is located for abutment with a second abutment (19), formed by a surface of a piston (9) supported by the variator shaft (1), to restrict axial sliding movement of the independent cylindrical pin (6) along the guide grooves (7, 8) as the movable conical pulley (3) slides axially along the variator shaft (1), and the variator shaft (1) has an axially fluid supply line which extends axially along a portion of the variator shaft (1) and only a single radial bore extends through the variator shaft to a pressure chamber.

\* \* \* \* \*